(12) United States Patent
Krynski

(10) Patent No.: US 9,288,124 B1
(45) Date of Patent: *Mar. 15, 2016

(54) SYSTEMS AND METHODS OF CLASSIFYING SESSIONS

(71) Applicant: A9.com, Inc., Palo Alto, CA (US)

(72) Inventor: Tevye Rachelson Krynski, Oakland, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,922

(22) Filed: Apr. 1, 2013

Related U.S. Application Data

(63) Continuation of application No. 12/133,981, filed on Jun. 5, 2008, now Pat. No. 8,413,250.

(51) Int. Cl.
| | |
|---|---|
| *G06F 7/04* | (2006.01) |
| *G06F 17/30* | (2006.01) |
| *H04N 7/16* | (2011.01) |
| *H04L 12/26* | (2006.01) |
| *H04L 29/08* | (2006.01) |
| *G06F 11/20* | (2006.01) |
| *H04L 29/06* | (2006.01) |

(Continued)

(52) U.S. Cl.
CPC ............... *H04L 43/04* (2013.01); *H04L 63/14* (2013.01); *G06F 11/20* (2013.01); *G06Q 30/06* (2013.01); *H04L 45/32* (2013.01); *H04L 63/1458* (2013.01); *H04L 63/1466* (2013.01); *H04L 67/1002* (2013.01)

(58) Field of Classification Search
CPC ..... H04L 45/32; H04L 63/14; H04L 63/1458; H04L 63/1466; H04L 67/1002; H04L 63/00; H04L 63/04; G06F 11/20; G06Q 30/06
USPC ............................ 726/4, 5, 17, 22, 23, 27–30
See application file for complete search history.

(56) References Cited

U.S. PATENT DOCUMENTS

| | | | | |
|---|---|---|---|---|
| 6,985,722 | B1 * | 1/2006 | Snelgrove et al. ............ | 455/420 |
| 7,058,974 | B1 * | 6/2006 | Maher et al. .................... | 726/13 |

(Continued)

OTHER PUBLICATIONS

"Final Office Action dated Mar. 13, 2012", U.S. Appl. No. 12/133,981, 28 pages.

(Continued)

*Primary Examiner* — Jayesh Jhaveri
(74) *Attorney, Agent, or Firm* — Hogan Lovells US LLP

(57) ABSTRACT

Systems and methods of classifying sessions are disclosed. A particular method monitors user activity at one or more servers accessible via a network and capturing event entries in an activity log for user activity that is detected. The event entries include descriptive information regarding a user action, a client identifier and a session identifier. The method also includes attempting to classify sessions associated with a plurality of event entries of the activity log as legitimate use or illegitimate use of resources of the one or more servers. The method further includes identifying unclassified sessions. The method also includes determining a count of a number of unclassified sessions associated with a particular client identifier and determining a total number of sessions associated with the particular client identifier. The method further includes classifying the unclassified sessions as legitimate use or illegitimate use of the resources of the one or more servers.

19 Claims, 3 Drawing Sheets

(51) Int. Cl.
*H04L 12/721* (2013.01)
*G06Q 30/06* (2012.01)

(56) References Cited

U.S. PATENT DOCUMENTS

| | | | |
|---|---|---|---|
| 7,069,588 B2 | 6/2006 | Call et al. | |
| 7,143,442 B2 * | 11/2006 | Scarfe | H04L 12/26 726/11 |
| 7,363,528 B2 * | 4/2008 | Chan | H04L 63/1433 714/4.3 |
| 7,376,969 B1 * | 5/2008 | Njemanze | G06F 21/55 709/224 |
| 7,389,343 B2 | 6/2008 | Busch et al. | |
| 7,475,405 B2 * | 1/2009 | Manganaris | G06F 21/552 706/45 |
| 7,483,972 B2 * | 1/2009 | Bhattacharya | H04L 63/1416 709/224 |
| 7,523,301 B2 | 4/2009 | Nisbet et al. | |
| 7,596,614 B2 | 9/2009 | Saunderson et al. | |
| 7,787,390 B1 * | 8/2010 | Orr | H04L 41/0681 370/252 |
| 7,805,482 B2 * | 9/2010 | Schiefer | G06Q 10/06 340/521 |
| 7,840,405 B1 * | 11/2010 | Lee et al. | 704/243 |
| 7,971,237 B2 | 6/2011 | Caslin et al. | |
| 8,091,132 B2 * | 1/2012 | Ansari et al. | 726/23 |
| 8,640,202 B2 * | 1/2014 | Roy | 726/4 |
| 2002/0035698 A1 | 3/2002 | Malan et al. | |
| 2003/0046577 A1 | 3/2003 | Silverman | |
| 2003/0046581 A1 * | 3/2003 | Call et al. | 713/201 |
| 2003/0188189 A1 * | 10/2003 | Desai | H04L 63/145 726/23 |
| 2004/0059947 A1 | 3/2004 | Lee | |
| 2004/0193943 A1 | 9/2004 | Angelino et al. | |
| 2005/0251406 A1 * | 11/2005 | Bolt | G06Q 30/0185 726/23 |
| 2006/0174324 A1 | 8/2006 | Zur et al. | |
| 2006/0282884 A1 * | 12/2006 | Pomerantz | 726/5 |
| 2007/0136477 A1 | 6/2007 | Bryce et al. | |
| 2008/0086558 A1 * | 4/2008 | Bahadori et al. | 709/224 |
| 2008/0196085 A1 | 8/2008 | Nagoya et al. | |
| 2009/0265317 A1 * | 10/2009 | Buehrer et al. | 707/3 |
| 2009/0271453 A1 | 10/2009 | Ben-Natan | |

OTHER PUBLICATIONS

"Non Final Office Action dated Sep. 2, 2011", U.S. Appl. No. 12/133,981, 23 pages.

"Notice of Allowance dated Dec. 6, 2012", U.S. Appl. No. 12/133,981.

* cited by examiner

SYSTEMS AND METHODS OF CLASSIFYING SESSIONS

FIELD OF THE DISCLOSURE

The present disclosure is generally related to systems and methods to classify sessions.

BACKGROUND

Improvements in computing and information technologies have led to an increase in unauthorized or illegitimate use of network resources. Such illegitimate use can be harmful to the network resources or to the business interests of the parties that own the network resources. For example, a search engine may expend considerable time and effort to generate a search index. So-called search spammers may set up automated processes (sometimes called "bots") to replicate or otherwise tamper with the search index by sending multiple searches to the search engine. In addition to replicating data, illegitimate users of the network resources may cause other problems, such as using up bandwidth or other processing resources or generating misleading data (e.g., skewing popularity data).

DETAILED DESCRIPTION

Figure 1:
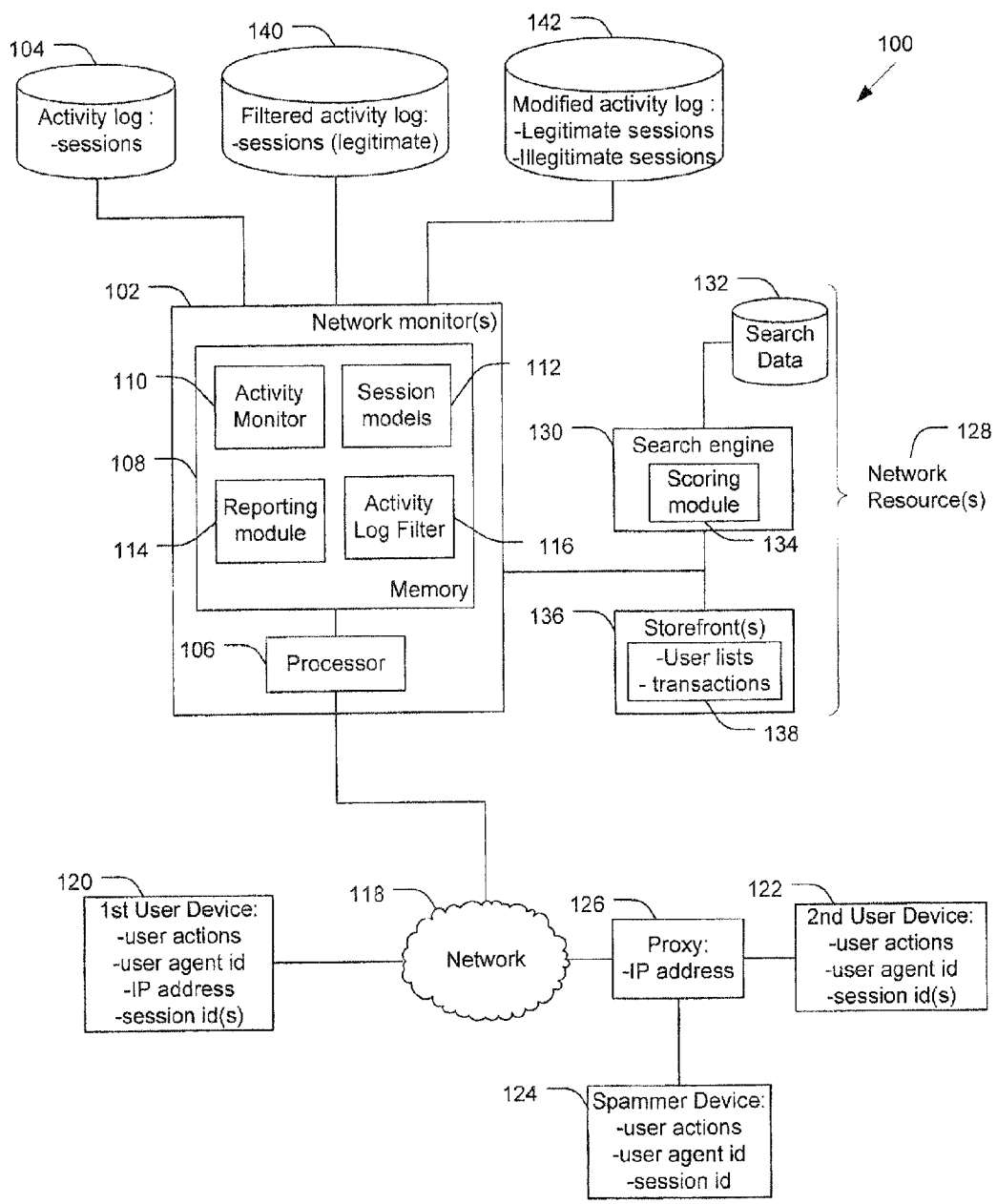
FIG. 1 is a block diagram of a particular embodiment of a system to classify sessions.

Systems and methods of classifying sessions are disclosed. A particular system includes an activity log having event entries associated with user activity at a networked computing system. Each of the event entries includes information about a type of the user activity, a client identifier associated with the user activity, and a session identifier associated with the user activity. The system also includes an activity log filter. The activity log filter attempts to classify sessions associated with event entries of the activity log as legitimate use or illegitimate use of resources of the networked computing system based at least partially on the type of user activity, the session identifier and the client identifier of each event entry. The activity log filter also identifies unclassified sessions associated with a particular client identifier. The activity log filter further determines a count of a number of the unclassified sessions associated with the particular client identifier and determines a total number of sessions associated with the particular client identifier. The activity log filter also classifies the unclassified sessions associated with the particular client identifier as legitimate use or illegitimate use of the resources of the networked computing system based on the count of the number of the unclassified sessions associated with the particular client identifier and based on the total number of sessions associated with the particular client identifier.

In a particular embodiment, a method of classifying sessions includes monitoring user activity at one or more servers accessible via a network and capturing event entries in an activity log for user activity that is detected. Each of the event entries includes descriptive information regarding a user action, a client identifier and a session identifier. The method also includes attempting to classify sessions associated with a plurality of event entries of the activity log as legitimate use or illegitimate use of resources of the one or more servers based at least partially on the user actions, the session identifiers and the client identifiers associated with the plurality of event entries. The method further includes identifying unclassified sessions. Unclassified sessions are sessions that were not classified as legitimate use or illegitimate use of the resources of the one or more servers. The method also includes determining a count of a number of unclassified sessions associated with a particular client identifier and determining a total number of sessions associated with the particular client identifier. The method further includes classifying the unclassified sessions associated with the particular client identifier as legitimate use or illegitimate use of the resources of the one or more servers based at least partially on the number of unclassified sessions associated with the particular client identifier and the total number of sessions associated with the particular client identifier.

In another embodiment, a computer-readable medium includes instructions that, when executed by a processor, cause the processor to classify sessions. The computer-readable medium includes instructions that, when executed by the processor, cause the processor to access an activity log. The activity log includes a plurality of event entries related to user activities performed using a network. Each of the event entries includes descriptive information regarding a user action, a session identifier and a client identifier. The computer-readable medium includes instructions that, when executed by the processor, cause the processor to attempt to classify sessions associated with a plurality of event entries of the activity log as legitimate use or illegitimate use of resources of the network based at least partially on the user actions, the session identifiers and the client identifiers associated with the plurality of event entries. The computer-readable medium also includes instructions that, when executed by the processor, cause the processor to identify unclassified sessions, wherein the unclassified sessions were not classified as legitimate use or illegitimate use. The computer-readable medium further includes instructions that, when executed by the processor, cause the processor to determining a count of a number of unclassified sessions associated with a particular client identifier and a total number of sessions associated with the particular client identifier. The computer-readable medium also includes instructions that, when executed by the processor, cause the processor to classify the unclassified sessions associated with the particular client identifier as legitimate use or illegitimate use based at least partially on the number of unclassified session associated with the particular client identifier and the total number of sessions associated with the particular client identifier.

FIG. 1 depicts a particular embodiment of a system to classify sessions, the system generally designated 100. The system 100 includes a network monitor 102 to monitor user activity associated with particular network resources 128. The network resources 128 can include one or more servers or other networked computing devices. For example, the network resources 128 can include one or more servers that are associated with a search engine 130, one or more servers that are associated with an electronic storefront 136, one or more servers that host a database, any other type of server or computing device, or any combination thereof.

In a particular embodiment, the network monitor 102 includes a processor 106, and memory 108 accessible to the processor 106. The network monitor 102 can also include one or more modules 110-116 adapted to perform various functions of the network monitor. The modules may be implemented in hardware (e.g., using application specific integrated circuits), in software (e.g., as instructions stored at the memory 108 or another computer-readable medium), or in any combination thereof. For example, the modules 110-116 can include an activity monitor 110, one or more session models 112, a reporting module 114, and an activity log filter 116.

In a particular embodiment, the activity monitor 110 is adapted to generate event entries in an activity log 104 when user activity is detected. The event entries may include information about a type of the user activity, a client identifier associated with the user activity, and a session identifier associated with the user activity. For example, the type of the user activity can include mouse events (e.g., clicking on or otherwise selecting an item, mouseover of the item, and so forth), or keyboard events (e.g., particular key selections). The type of user activity can also include additions of items to a shopping cart function at the storefront 136, searches performed via the search engine 130, selection of search results, purchases or other transactions, additions of items to lists (e.g., recommended lists, favorites list, wish lists), other types of user events, or any combination thereof. The event entries can also include a timestamp or other information about a rate at which user activities occurred.

The activity log 104 may store any number of sessions. In a particular embodiment, a session is the set of event entries that have the same session identifier. In other embodiments, a session includes any set of event entries that are generated by a single user, that are believed (e.g., based on analysis by a server) to be generated by a single user, or any combination thereof. To illustrate, when a first user device 120 sets up communication with the network resources 128, a session identifier (e.g., as a cookie file) may be sent to the first user device 120. The session identifier enables the network resources 128 to maintain state information regarding the communications between the network resources 128 and the first user device 120 to associate future communications from the user device 120 with the same session identifier. The communications between the first user device 120 and the network resources 128 may include the session identifier, as well as other identification information such as a user agent identifier, a network address (e.g., an IP address), and information about a user action. If the first user device 120 omits the sessions identifier from communications with the network resources 128 (e.g., as a result of deleting the cookie file), the network resources 128 may assign the first user device 120 a new session identifier (and send a new cookie file with the new session identifier). Thus, the first user device 120 can be associated with more than one session in the activity log 104.

In a particular embodiment, the network resources 128 may communicate via the network 118 with one or more other user devices, such as second user device 122 and spammer device 124, via a proxy server 126. For example, the second user device 122 may communicate information about a user action and a user agent identifier associated with one or more sessions to the proxy server 126 using a network address associated with the second user device 122. The proxy server 126 may send the information about the user action and the user agent identifier to the network resources 128 using a network address, such as an IP address, of the proxy server 126. The network resources 128 may reply with, among other things, a session identifier, such as a cookie file, related to communications between the second user device 122 and the network resources 128.

Similarly, the spammer device 124 may send information about user actions and a user agent identifier associated with one or more sessions to the proxy server 126 using a network address associated with the spammer device 124. The proxy server 126 may send the information about the user action and the user agent identifier to the network resources 128 using the network address of the proxy server 126. The network resources may reply with, among other things, a session identifier, such as a cookie file, related to communications between the spammer device 124 and the network resources 128. When the second user device 122 or the spammer device 124 communicates with the network resources 128 and fails to send a session identifier, the network resources 128 may assign a new session identifier to the communications. That is, the network resources 128 may open a new session. Hence, if the spammer device 124 frequently starts new sessions, no session associated with the spammer device 124 may have enough events to be categorized as related to legitimate or illegitimate use of the network resources. That is, some sessions may not have enough events to be classified. Additionally, since the second user device 122 uses the same network address to communicate with the network resources (i.e., the network address of the proxy server 126) and may have the same user agent identifier, sessions attributable to the second user device may be difficult to distinguish from sessions related to the spammer device 124.

In a particular embodiment, the system 100 also includes an activity log filter 116. The activity log filter 116 attempts to classify sessions associated with event entries of the activity log 104 as legitimate use or illegitimate use of network resources 128. The activity log filter 116 may attempt to classify the sessions based at least partially on the user activity, the session identifier and the client identifier of each event entry. For example, the activity log filter 116 may access the session models 112 and compare the sessions with the session models 112. The session models 112 may include information that associates particular characteristics of sessions with either legitimate use or illegitimate use of the network resources 128. For example, the session models 112 may associate actions occurring at a relatively high rate with illegitimate use. In another example, the session models 112 may associate making purchases of numerous items with legitimate use. The session models 112 may be based on a probabilistic analysis of historical activity logs.

After the activity log filter 116 attempts to classify sessions of the activity log 104, a number of the sessions may remain unclassified. For example, one or more of the sessions may include too few event entries to be classified using the session models 112. The activity' log filter 116 may identify unclassified sessions associated with a particular client identifier and determine a count of the number of the unclassified sessions associated with the particular client identifier. The activity log filter 116 may also determine a total number of sessions associated with the particular client identifier.

Based on the count of the number of the unclassified sessions associated with the particular client identifier and the total number of sessions associated with the particular client identifier, the activity log filter 116 may classify the unclassified sessions as legitimate use or illegitimate use of the network resources 128. In a particular illustrative embodiment, the activity log filter 116 classifies the unclassified sessions collectively as though all of the actions from the unclassified sessions were from a single session. For example, the activity log filter 116 may treat the unclassified sessions as a single aggregate session and compare the aggregate session to the session models 111. In another example, the activity log filter 116 may determine a probability that any particular session will be unclassified for a particular client identifier that is not associated with illegitimate use. The activity log filter 116 may also use other probabilities to classify the unclassified sessions. For example, the session models 112 may include a pre-determined probability that a particular legitimate session will be unclassified; a pre-determined probability that for a particular client identifier that is associated with illegitimate use, any particular session will be unclassified; and so forth. The activity log filter 116 may access the pre-determined probabilities to classify the unclassified sessions. In a particular illustrative embodiment, the activity log filter 116 is adapted to determine a probability of having the number of unclassified sessions out of the total number of sessions when no event entry of the unclassified sessions is related to illegitimate use of the resources of the networked computing system.

In a particular embodiment, the system 100 also includes the reporting module 114. The reporting module 114 may be adapted to generate an output based on the activity log 104. For example, the output can include a modified activity log 142. The modified activity log 142 can include information indicating whether each of the event entries is associated with legitimate use or illegitimate use of the network resources 128. The modified activity log 142 may be used to generate statistics regarding use of the network resources 128, to verify or modify the session models 112, and so forth. In another example, the output can include a filtered activity log 140. The filtered activity log 140 may include only those sessions that are associated with legitimate use of the network resources 128. Either the filtered activity log 140 or the modified activity log 142 can be used by the network resources 128. For example, the search engine 130 may be adapted to provide search results that include search result data items. The search engine 130 may include a scoring module 134 that determines a popularity score for each search result data item. The search result data items may be ordered in a search result display based at least partially on the popularity score of each of the search result data items. The scoring module 134 may determine the popularity score based at least partially on the filtered activity log 140 or the modified activity log 142 so that sessions associated with illegitimate use of the network resources 128 are not used to determine the popularity score.

Figure 2:
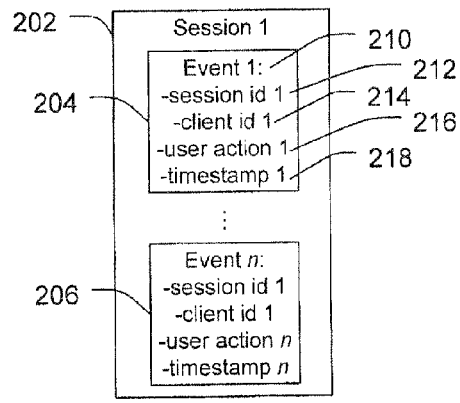
FIG. 2 is a block diagram of a particular embodiment of a session.

FIG. 2 depicts a first particular embodiment of session data. The session data 202 is associated with a first session. The session data 202 includes a first event 204 and one or more additional events, such as an nth event 206. The first event 204 includes an event identifier 210. The event identifier 210 distinguishes the first event 204 from other events in an activity log, such as the activity log 104 depicted in FIG. 1.

In a particular embodiment, the first event 204 includes a session identifier 212. The session identifier 212 may be used by a server or other network resource to maintain state information regarding communications with a user computing device. For example, the session identifier 212 can be included within a cookie file, can include an identifier associated with a cookie file, or can include another unique identifier used to maintain state information, or any combination thereof. The events in a particular session each include or are associated with the same session identifier.

In a particular embodiment, the first event 204 includes also a client identifier 214. The client identifier 214 may include information about a particular client accessing a network resource. For example, the client identifier 214 can include a network address of the client, such as an Internet Protocol (IP) address. The client identifier 214 may also include information about an application or applications used by the client to access the network resource. For example, the client identifier 214 can include a user agent identifier, which is associated with a particular application running at a user's computer, such as a web browser application.

In a particular embodiment, the first event 204 also includes information about a user action 216 and a timestamp 218 associated with the user action 216. The user action information can include, without limitation, mouse events, keyboard events, additions to a shopping cart, additions to another list (e.g., a wish list, gift registry, recommended list, favorites list, etc.), purchase indications, search indications, search text, other types of user events, or any combination thereof. The nth event 206 can also include an event identifier, a session identifier, a client identifier, a user action, a time stamp, other information about the event, session, client or user action, or any combination thereof.

In a particular embodiment, the first session 200 can be classified as related to legitimate use of network resources or illegitimate use of network resources based on one or more session models, such as session models 112 depicted in FIG. 1. The session data 202 can be analyzed and compared to the session models to determine whether the session data 202 is indicative of particular types of use of the network resources. The particular types of use can be legitimate use, illegitimate use, or subcategories of legitimate or illegitimate use. Examples of legitimate use of the network resources can include, without limitation, customers browsing or searching, customers purchasing products or engaging in other transactions, and so forth. Examples of illegitimate use include, without limitation, replicating all or portions of a database, artificially boosting popularity information, and so forth. In an illustrative embodiment, the session models can include probability models. For example, historical information about user interactions with the network resources can be analyzed to determine probability models associated with the various types of legitimate use, illegitimate use, or both. Thus, the session data 202 can be analyzed to determine the probability that the first session 200 is associated with legitimate use or illegitimate use of the network resources.

Figure 3:
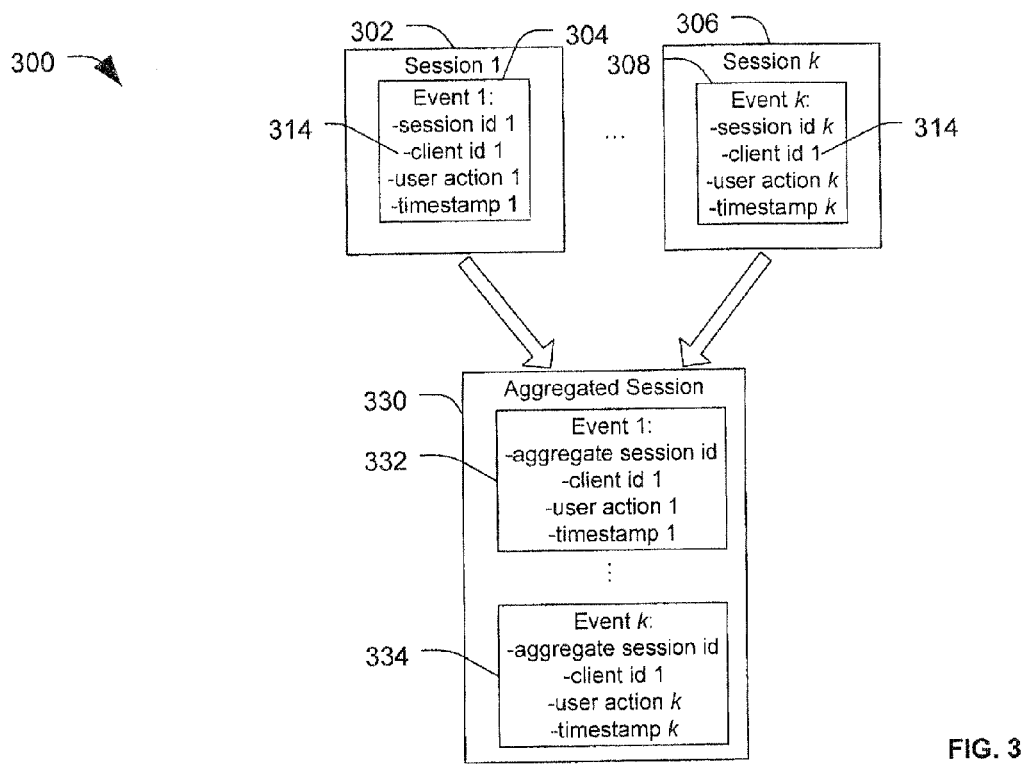
FIG. 3 is block diagram of a particular embodiment of a plurality of sessions.

FIG. 3 depicts a second particular embodiment of session data. The session data 300 includes information about a first session 302 and information about one or more other sessions, such as a kth session 306. The session data 300 illustrates multiple sessions 302, 306 associated with a single client identifier 314. In a particular embodiment, session data having characteristics similar to the session data 300 may be observed in an activity log when multiple users access network resources via a proxy server. The proxy server may communicate with the network resources using the proxy server's network address. Thus, if two or more users have the same user agent, and the client identifier includes the network address and a user agent identifier, then the client identifier 314 for the two or more users may be the same.

Each session 302, 306 includes at least one event 304, 308, respectively. In an illustrative embodiment, each session 302, 306 includes relatively few events. For example, the sessions 302, 306 may include too few events to be classified as indicative of legitimate or illegitimate use of the network resources. In order to classify the sessions 302, 306, the sessions 302, 306 may be combined to form an aggregate session 330. The aggregate session 330 may treat each of the events of the first session 302, the kth session 306, and any other unclassified sessions associated with the client identifier 314, as a single session with multiple event entries. For example, the first event 304 of the first session 302 can be considered a first event 332 of the aggregated session 330. Similarly, the kth event 308 of the kth session 306 can be considered a kth event 334 of the aggregated session 330. Each event of the session data 300 can be grouped into the aggregated session 330.

In a particular embodiment, the aggregated session 330 can be compared to one or more session models to classify the aggregated session 330. By aggregating unclassified sessions, the problem of each session including too few events to be classifiable can be overcome.

Figure 4:
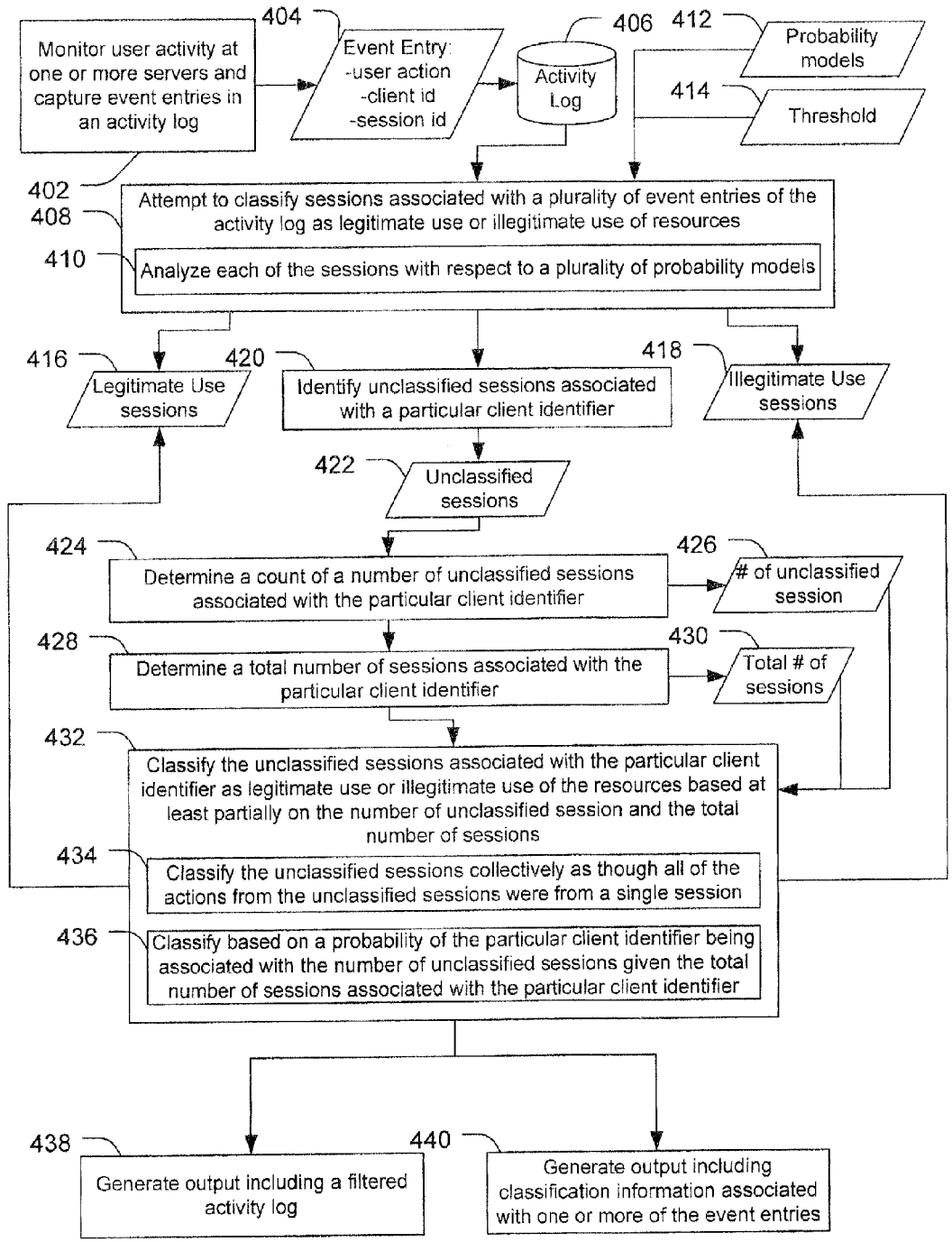
FIG. 4 is flow chart of a particular embodiment of a method of classifying sessions.

FIG. 4 depicts a particular embodiment of a method of classifying sessions. The method includes, at 402, monitoring user activity at one or more servers accessible via a network. User activity that is detected may be captured as event entries 404 in an activity log 406. Each event entry 404 can include descriptive information regarding a user action, a client identifier and a session identifier. For example, the descriptive information regarding the user action can include mouse events (e.g., an indication that a user moused over an item in a display, selected the item, etc.), keyboard events (e.g., an indication that the user entered particular text, selected the displayed item using a keyboard entry, etc.). In another example, the descriptive information can include information indicating that the user added a displayed item to a shopping cart or to another list (e.g., a wish list, gift registry, recommended list, favorites list, etc.), an indication that the user purchased the item, search text input by the user, other actions taken by the user via the one or more servers, or any combination thereof.

In a particular illustrative embodiment, the client identifier ("client id") can include a user agent identifier and a network address, such as an Internet Protocol (IP) address, associated with the user. In certain circumstances, e.g., when communications are routed via a proxy server, two or more users may have the same client id. In a particular embodiment, each client id is associated with one or more users and does not vary from event entry to event entry. For example, when the client id includes the IP address, a particular IP address may be associated with multiple users. To illustrate, when a proxy server is used, a user's computing device communicates with the proxy server using the user's IP address. The proxy server then communicates with the one or more servers using the proxy server's IP address. Thus, when multiple users communicate with the one or more servers via a proxy server, the IP address of each user may be the same from the perspective of the one or more servers. Additionally, the user agent identifier identifies the particular agent application that a user's computing device is using to communicate with the one or more servers; however, more than one user may use the same type of user agent application. Thus, the client id can be the same for two or more users.

In a particular embodiment, each session identifier is associated with a single user. For example, when a user's computing device accesses a server, the server may assign a session identifier to communications with the user's computing device. The server, the user's computing device, or both, may use the session identifier to help maintain state information related to communications with the user's computing device. For example, the server may send a cookie including the session identifier to the user's computing device. One problem with this method is that users may choose not to submit the session identifier to the server during subsequent events, resulting in more than one session identifier being associated with a particular user. To illustrate, the user can delete the cookie file. The one or more servers may then treat communications from the user's computing device as a new session and generate a new session identifier.

Users that attempt to use the resources of the one or more servers in an illegitimate manner may use a proxy server to obscure their identity, by sharing a client identifier with legitimate users and not submitting their session identifier to the server (e.g., by not accepting cookies or frequently deleting the cookie file). When an illegitimate user does this, the activity log 406 may include a relatively large number of relatively short sessions that are associated with the illegitimate user.

The method also includes, at 408, attempting to classify sessions associated with a plurality of event entries 404 of the activity log 406 as legitimate use sessions 416 or illegitimate use sessions 418 of resources of the one or more servers based at least partially on the user actions, the session identifiers and the client identifiers associated with the plurality of event entries 404. For example, the method may attempt to classify sessions by, at 410, analyzing each of the sessions with respect to a plurality of probability models 412. The probability models 412 may be derived based on analysis of historical data associated with user interactions with the one or more servers. To illustrate, known legitimate use or known illegitimate use of the resources of the one or more servers can be analyzed to determine probabilities associated with each. The probability models 412 can include information about the probability of various types of behavior (e.g., event entries associated with a user) being related to legitimate use or illegitimate use of the resources of the one or more servers. The number of probability models 412 and the specific types of legitimate or illegitimate use that are modeled may depend on the nature of the servers. For example, illegitimate users of a news and information website server may be of a different type (and thus have a different probability model 412) than illegitimate users of a storefront website server.

The method also includes, at 420, identifying unclassified sessions 422. The unclassified sessions 422 include sessions that were not classified as legitimate use or illegitimate use of the resources of the one or more servers. For example, one or more of the unclassified sessions 422 may include too few event entries 404 to be classified with a threshold 414 degree of certainty as legitimate use or illegitimate use using the plurality of probability models 412. To illustrate, as discussed above, an illegitimate user may frequently reset his or her session, which can result in the user generating a relatively large number of relatively short sessions. One or more of these relatively short sessions may include too few event entries 404 to be classified using the probability models 412.

In a particular embodiment, method also includes, at 424, determining a count 426 of a number of the unclassified sessions 422 associated with a particular client identifier, and, at 428, determining a total number 430 of sessions associated with the particular client identifier. The method also includes, at 432, classifying the unclassified sessions 422 associated with the particular client identifier as legitimate use or illegitimate use of the resources of the one or more servers based at least partially on the number 426 of unclassified sessions associated with the particular client identifier and the total number 430 of sessions associated with the particular client identifier.

In a particular embodiment, the method includes, at 434, classifying the unclassified sessions 422 associated with the particular client identifier collectively as though all of the actions from these sessions were from a single session. In another particular embodiment, the unclassified sessions associated with the particular client identifier are classified, at 436, based on a probability of the particular client identifier being associated with the number of unclassified sessions given the total number of sessions associated with the particular client identifier.

In a particular embodiment, the method also includes generating an output related to the classified sessions 416, 418. For example, the method may include, at 438, generating an output including a filtered activity log. The filtered activity log may not include event entries 404 associated with sessions classified as illegitimate use 418. In another example, the method may include, at 440, generating an output including classification information associated with one or more of the event entries 404 of the activity log 406. The classification information may indicate whether each of the one or more event entries 404 is associated with legitimate use 416 or illegitimate use 418 of the resources of the network.

Particular embodiments related to search logs that represent user activity while using a search engine. For example, the activity log 104 of FIG. 1, or the activity log 406 of FIG. 4 may be a search log. Such search logs may include entries associated with various types of activity, such as, but not limited to: searches (e.g., keyword-based queries, category browsing, etc.), clicks (e.g., mouse or keyboard actions to select an item), adds (e.g., additions to a list, such as a wishlist or shopping cart, etc.), deletes (deletions from the list, such as removing an item from the shopping cart), and purchases. Search entries can include information about search terms, information about categories browsed, and so forth.

The search data may be used to determine popularity scores, which may, in turn, be used to rank search results produced by the search engine. The search data may also be used for other purposes such as estimating shopping volume at a storefront associated with the search engine. Illegitimate use of the search engine can cause the search data to be erroneous. For example, such illegitimate use can distorts metrics used to analyze performance of various network resources, such as search totals, click rates, and add rates. The illegitimate use may make it difficult to use customer behavior information to influence relevance computations, because the illegitimate use can cause incorrect or artificial associations between keywords and items.

In the context of search engines, such illegitimate use may be referred to as "search spam." Illegitimate users of the search engine can include, for example, people attempting to skew a popularity score of a particular product; user software applications, such as browsers, prefetching information; automated processes to replicate all or a portion of a catalog, database or index associated with the search engine; competitors checking pricing, availability or selection of a storefront associated with the search engine; data gathering applications generating a search index; testers submitting traffic for test purposes; individuals attempting to adversely impact performance of the search engine; people repeatedly checking to determine when a popular product becomes available; network health monitors (e.g., ping); and so forth.

Sessions related to legitimate use and sessions related to illegitimate use may be combined in the search data. Methods and systems of the present disclosure enable classification of sessions in the search data as legitimate use or illegitimate use. In a particular embodiment, a session represents all activity attributable to a single user of the network resources. In an illustrative embodiment, the sessions may be tracked by storing a cookie file on a user's computing device. The cookie file may include a session identifier associated with the user. In some cases, a user may not accept cookies, in which case a different session identifier may be assigned for each action the user takes. In these cases, a client identifier may be used to group sessions. The client identifier may include a network address (e.g., an Internet Protocol (IP) address), a user agent identifier, or both.

In a particular embodiment, a probabilistic approach is used to classify sessions as legitimate use or illegitimate use. For example, the posterior probability of a client being an illegitimate user (also called "a spammer" in this embodiment), P(Spammer|D), can be determined, where D represents the data for the client. Assuming that every session is either a legitimate user (also called a "shopper" in this embodiment) or a spammer, P(Spammer|D) can be computed from the posterior odds. Using Bayes' rule, the log posterior odds of spammer to shopper can be decomposed into the sum of the log prior odds and the log likelihood ratio:

$$\ln P(Spammer|D)/P(Shopper|D) = \ln P(Spammer)/P(Shopper) + \ln P(D|Spammer)/P(D|Shopper)$$

Given an initial set of search data, the prior odds (from the first term on the right side of the equation above) that any given session can be called a spammer or shopper may not be known; however, initial estimates of the prior odds can be used and the prior odds may be re-computed later based on a rate at which sessions are identified as illegitimate.

The log likelihood ratio (the second term on the right side of the equation above) may be determined by determining a probability distribution (or probability model) over D for both shoppers and spammers. When there may be more than one type of spammer, more than one type of shopper, or both, the probability distribution may account for the various types. For example, when there are several different kinds of spammers, and each may be associated with a child client type, the classification of spammer (i.e., illegitimate user) may include a composite (or Parent type) of the spammer child client types. Probabilities related to the various client types can be accumulated according to the following equation:

$$P(D | ParentType) = \sum_{ChildTypes} P(ChildType | ParentType) P(D | ChildType)$$

For example, the Spammer Parent type (i.e., the overall classification of spammer) may include child types (i.e., various types of spammers) such as, but not limited to, browsers, crawlers, boosters and mimics. In a particular embodiment, one or more of the child types may also be subdivided into various sub-child types. Thus, with respect to the examples of spammer child types given above, browsers issuing prefetch requests, crawlers indexing a network resource, boosters attempting to artificially inflate the popularity of an item, and mimics copying data from a network resource may all be sub-types of illegitimate use of the network resources. In a particular embodiment, a similar analysis may be applied to legitimate users (e.g., shoppers) to determine sub-types of legitimate users.

Parameter values and their distributions used to calculate the probabilities can be determined based on sample user activity data related to the network resources (e.g., the search engine). In a particular embodiment, unsupervised parameter learning can be used. Such an unsupervised parameter learning method may be based on expectation maximization. For example, a set of features of client data, D, that are expected to distinguish between shoppers and spammers can be selected. The parameters of the probability distribution over D for shoppers can be estimated by pretending that all of the sessions in the client data are related to shoppers (i.e., that all of the data is related to legitimate use of the network resources). Estimates of the parameters of a probability distribution over D for spammers may be made, and P(Spammer|D) may be determined for each client of the client data using the above embodiments discussed above. Maximum likelihood estimation can be used to learn new parameters for spammers by weighting each client by P(Spammer|D$_{client}$). Additionally, parameters for shoppers can be learned by weighting each client by P(Shopper|$ID_{client}$). The unsupervised parameter learning method may be repeated until a desired endpoint is reached. For example, the unsupervised parameter learning method can be iterated until the parameters no longer change significantly.

Examples of sets of features that may distinguish shoppers from spammers in the context of a search engine associated with an electronic storefront include, but are not limited to: elapsed time between actions; a number of actions associated with client (or session); a user agent of the client; whether the user has signed in to a user account; whether the use has made a purchase; how many items were displayed in search results and how many items from the search results were selected for viewing; how many times a particular item was viewed; a number of searches after which an item was viewed; whether a search was a refinement of a previous search; how many sessions were associated with a particular client identifier; and how many sessions associated with the client identifier were not classifiable as legitimate or illegitimate use.

In accordance with various embodiments of the present disclosure, the methods described herein may be implemented by software programs executable by a computer system. Further, in an exemplary, non-limiting embodiment, implementations can include distributed processing, component/object distributed processing, and parallel processing. Alternatively, virtual computer system processing can be constructed to implement one or more of the methods or functionality as described herein.

Particular embodiments can be implemented using a computer system executing a set of instructions that cause the computer system to perform any one or more of the methods or computer based functions disclosed herein. The computer system may operate as a standalone device or may be connected (e.g., using a network) to other computer systems or peripheral devices. For example, the general computer system can include or be included within any one or more of the communication devices, call center systems, interactive voice response systems, or databases depicted in FIGS. 1 and 2. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable medium. The term "computer-readable medium" includes a single medium or multiple media, such as a centralized or distributed database, and/or associated caches and servers that store one or more sets of instructions. The term "computer-readable medium" also includes any medium that is capable of storing, encoding or carrying a set of instructions for execution by a processor or that cause a computer system to perform any one or more of the methods or operations disclosed herein.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-transitory computer-readable storage medium including instructions that, when executed by at least one processor of a computing system, cause the computing system to:
    detect a plurality of communication sessions associated with user activity;
    obtain information about the plurality of communication sessions, the information including at least one of a client identifier for individual sessions in the plurality of communication sessions, a session identifier for individual sessions in the plurality of communication sessions, or a session type for individual sessions in the plurality of communication sessions;
    perform a comparison of the information about the plurality of communication sessions to data included in a sessions model, the data indicating session characteristics corresponding to at least one of human activity or automated activity;

attempt to classify individual sessions of the plurality of communication sessions as corresponding to human activity or to automated activity based, at least in part, on the comparison of the information to the data;

identify, in response to the attempt to classify individual sessions as corresponding to human activity or to automated activity, one or more individual unclassified sessions that are unable to be classified as corresponding to human activity or automated activity based, at least in part, on the comparison of the information to the data;

obtain information about a respective client identifier for the individual unclassified sessions previously identified, the information including a quantity of other unclassified sessions associated with the respective client identifier and a quantity of total sessions associated with the respective client identifier; and classify the individual unclassified sessions previously identified based, at least in part, on the quantity of other unclassified sessions relative to the quantity of total sessions.

2. The non-transitory computer-readable storage medium of claim 1, wherein the instructions further cause the computing system to:

perform a probabilistic analysis of one or more historical logs associated with the user activity; and generate the data included in the sessions model based, at least in part, on the probabilistic analysis.

3. The non-transitory computer-readable storage medium of claim 1, wherein the instructions further cause the computing system to:

obtain one or more classification statistics relating to the plurality of communication sessions; and modify the data included in the sessions model based, at least in part, on the one or more classification statistics.

4. The non-transitory computer-readable storage medium of claim 1, wherein the data included in the sessions model indicates that sessions associated with a purchase transaction have a likelihood of corresponding to human activity, and wherein attempting to classify individual sessions further comprises:

determining, based at least in part on the information about the plurality of communication sessions, whether individual sessions are associated with a purchase transaction.

5. The non-transitory computer-readable storage medium of claim 1, wherein the data included in the sessions model indicates that sessions associated with activity occurring at a rate above a specified threshold have a likelihood of corresponding to automated activity, and wherein attempting to classify individual sessions further comprises:

determining, based at least in part on the information about the plurality of communication sessions, whether individual sessions are associated with respective activity that occurs at a respective rate above a specified threshold.

6. The non-transitory computer-readable storage medium of claim 1, wherein the sessions model corresponds to a probability model including at least a first probability that a first session type is associated with human activity and at least a second probability that a second session type is associated with automated activity.

7. The non-transitory computer-readable storage medium of claim 1, wherein the human activity is associated with legitimate activity, and wherein the automated activity is associated with illegitimate activity.

8. A computer-implemented method performed by a network monitor comprising:

under control of one or more computer systems configured with executable instructions, detecting an event associated with user activity in a communication session at a networked computing system;

obtaining information about the event from an activity log having event entries, the information including at least one of a client identifier associated with the event, an event identifier for the event, or information about an event type corresponding to the event;

performing a comparison of the information about the event to data included in a sessions model, the data included in the sessions model indicating event characteristics having a likelihood of corresponding to at least one of human activity or automated activity;

performing an attempt to classify the event as corresponding to human activity or automated activity based, at least in part, on the comparison of the information about the event to the data included in the sessions model;

identifying the event as being an unclassified event as a result of the attempt to classify the event being unsuccessful; and classifying the unclassified event based, at least in part, on information about the client identifier associated with the event by:

determining a quantity of other unclassified events associated with the client identifier;

determining a quantity of total events associated with the client identifier; and classifying the unclassified event based, at least in part, on the quantity of other unclassified events and the quantity of total events.

9. The computer-implemented method of claim 8, further comprising:

obtaining historical data associated with the user activity; and generating the sessions model based, at least in part, on the historical data.

10. The computer-implemented method of claim 8, further comprising:

obtaining classification data associated with the event; and modifying the sessions model based, at least in part, on the classification data associated with the event.

11. The computer-implemented method of claim 8, wherein the sessions model corresponds to a probability model including at least a first probability that a first event type is associated with legitimate activity and at least a second probability that a second event type is associated with illegitimate activity.

12. The computer-implemented method of claim 8, wherein the client identifier includes at least one of a user identifier or a network address.

13. The computer-implemented method of claim 8, wherein the sessions model is associated with a cookie file.

14. A system comprising:

at least one processor; and a memory device including instructions that, when executed by the at least one processor, cause the system to:

detect an event associated with user activity in a communication session at a networked computing system;

obtain information about the event from an activity log having event entries, the information including at least one of a client identifier associated with the event, an event identifier for the event, or information about an event type corresponding to the event;

perform a comparison of the information about the event to data included in a sessions model, the data included in the sessions model indicating event characteristics having a likelihood of being associated with human activity or automated activity;

perform an attempt to classify the event as being associated with human activity or automated activity based, at least in part, on the comparison of the information about the event to the data included in the sessions model;

identify the event as being an unclassified event as a result of the attempt to classify the event being unsuccessful; and classify the unclassified event based, at least in part, on information about the client identifier associated with the event by causing the system to further:

determine a quantity of other unclassified events associated with the client identifier;

determine a quantity of total events associated with the client identifier; and classify the unclassified event based, at least in part, on the quantity of other unclassified events and the quantity of total events.

15. The system of claim 14, wherein the instructions further cause the computing system to:
obtain historical data associated with the user activity; and
generate the sessions model based, at least in part, on the historical data.

16. The system of claim 14, wherein the instructions further cause the computing system to:
obtain classification data associated with the event; and
modify the sessions model based, at least in part, on the classification data associated with the event.

17. The system of claim 14, further comprising:
an activity log configured to store information relating to the event associated with the user activity.

18. The system of claim 14, wherein the event associated with the user activity includes a purchase transaction, and wherein the instructions cause the computing system to further:
communicate with an electronic marketplace to process the purchase transaction.

19. The system of claim 14, further comprising:
a search engine configured to provide search results, wherein the event associated with the user activity includes a search performed via the search engine.

* * * * *